(12) United States Patent
Kuwabara

(10) Patent No.: US 7,434,999 B2
(45) Date of Patent: Oct. 14, 2008

(54) LINEAR MOTION GUIDE UNIT WITH RETAINER FOR ROLLING ELEMENT

(75) Inventor: Hideki Kuwabara, Mino (JP)

(73) Assignee: Nippon Thompson Co., Ltd., Tokyo (JP)

( * ) Notice: Subject to any disclaimer, the term of this patent is extended or adjusted under 35 U.S.C. 154(b) by 312 days.

(21) Appl. No.: 11/282,762

(22) Filed: Nov. 21, 2005

(65) Prior Publication Data

US 2006/0120637 A1 Jun. 8, 2006

(30) Foreign Application Priority Data

Dec. 8, 2004 (JP) ............... 2004-355708

(51) Int. Cl.
*F16C 29/06* (2006.01)

(52) U.S. Cl. ................... 384/44

(58) Field of Classification Search ............ 384/43–45, 384/48, 51, 53–54; 474/164, 168; 33/706–708
See application file for complete search history.

(56) References Cited

U.S. PATENT DOCUMENTS 3,937,532 A 2/1976 Fuhrmann et al.

FOREIGN PATENT DOCUMENTS

| JP | 50-130952 | 10/1975 |
|----|-----------|---------|
| JP | 63-69816 | 5/1988 |
| JP | 63-123824 | 8/1988 |
| JP | 3343195 | 4/1998 |

*Primary Examiner*—Marcus Charles
(74) *Attorney, Agent, or Firm*—Browdy and Neimark P.L.L.C.

(57) ABSTRACT

A retainer to be installed in a linear motion guide unit is disclosed which composed of embracing parts to hold a roller on diametrically opposite sides thereof, and connecting flanges joining the embracing parts together with one another. The embracing parts to hold the roller between them are each made with a first lip raised above any one side thereof, and a second lip raised above another side thereof. The first and second lips raised in opposite direction are placed in an offset or staggered relation with one another in lengthwise direction of the embracing part or in axial direction of the roller so as to be tough to suffer any distortion and/or damage on molding operation. The retainer can sustain ample lubricant near the lips. The embracing parts come into rolling-contact with the rolling surface of the roller while the connecting flanges come into sliding contact with axially opposite ends of the roller.

14 Claims, 8 Drawing Sheets

LINEAR MOTION GUIDE UNIT WITH RETAINER FOR ROLLING ELEMENT

FIELD OF THE INVENTION

The present invention relates to a linear motion guide unit with retainers, sometimes called separators to space rolling elements from each other, which is comprised of an elongated guide rail, and a slider that is allowed to move on the elongated guide rail relatively to the guide rail by virtue of more than one rolling element of roller.

BACKGROUND OF THE INVENTION

Modern advanced technology extensively requires various sorts of linear motion guide units, especially, linear motion guide units of the type using rolling elements of cylindrical roller, which are also required to live up to various operating performances including high precision, high stiffness, high sliding velocity, high acceleration/deceleration, less noise, and so on. To cope with this, there have been conventionally provided linear motion guide units in which separators are interposed between any two adjoining rolling elements.

In Japanese Utility Model Laid-Open No. S63-69816, there is disclosed a linear guide unit that is comprised of a retainer of synthetic resin to accommodate therein a cylindrical roller for rotation in a way exposing any part thereof, a slider made therein with a circulating circuit to allow the cylindrical roller rolling through there, and a guide rail to support the slider thereon for linear movement through the cylindrical roller. With the linear guide unit stated earlier, the retainer is shaped like doughnut and made circular in transverse section around parts where any adjoining retainers in the circulating circuit might come into direct contact with one another. The leading and trailing rollers are received in their respective retainers in such a relation that their inter-axial distance is kept constant throughout the circulating circuit. Moreover, the retainer is made on the outside thereof with shoulders while the guide rail has recesses to fit over the shoulders of the retainer to guide steady the roller along the circulating circuit. The shoulders are made midway between radially opposite rolling surfaces of the cylindrical roller, which are raised above the retainer to expose themselves outside the retainer.

In production of the retainer having the shoulders on the outside thereof, the cylindrical roller is first placed inside a mold of a casting machine preparatory to injection molding of synthetic resin. The retainer in the linear guide unit constructed as stated earlier is envisaged keeping the adjacent rollers against direct collision with one another, making collision noise less while protecting the cylindrical roller against wearing away, thereby making sure of steady operation of the linear guide unit. Nevertheless, the retainer constructed as stated just earlier, as being made to cover the overall axial length of the roller, unfortunately needs the circulating circuit larger in diametral dimension of a passage caliber, making the linear guide unit itself bulky. This means that the prior retainer as recited earlier is not suited to shrink the linear guide unit in construction. The retainer of the type in which the roller fits with molding, moreover, is not ready for modern operating needs for high traveling speed, high acceleration/deceleration, and so on because a clearance left between the retainer and the roller is so tiny to trend to cause lubrication failure. With the prior linear guide unit constructed as recited earlier, furthermore, as the leading and trailing retainers in the circuit come into direct contact with one another around their outside convexes, the pitch or distance between the adjacent rollers gets inevitably greater while the circular length of the exposed area on the roller also gets shorter. This results in making the linear guide unit less in mechanical strength.

Another Japanese Utility Model Laid-Open No. S63-123824 discloses a roller retainer of synthetic resin constructed to embrace a rolling element therein in a way the rolling element is exposed in part outside at a circular rolling surface thereof, where the rolling element comes into rolling-contact a guide rail while a slider moves along the guide rail. More than one roller retainer is disposed in succession in a circulating circuit of the slider. The retainer is provided at the leading edge thereof with a raised portion nearly halfway in vertical direction, and also cut away partially at the trailing edge thereof to make a window in complementary relation to the raised portion of the following retainer to expose outside only the trailing surface of the rolling element through there. Thus, the raised portion of the retainer is brought into abutment against the exposed trailing surface of the preceding rolling element through the window of the retainer ahead of the raised portion of the retainer. Moreover, the retainer is made on the widthwise opposed sides thereof with sidewise raised portions to fit into their associated guide grooves cut deep in the circulating circuit. In production of the retainer constructed as stated earlier, the cylindrical roller is first placed inside a mold cavity of a casting machine preparatory to injection molding of synthetic resin. The retainer is envisaged keeping the adjacent rollers against direct collision with one another, making collision noise less while protecting the cylindrical roller against wearing away, thereby making sure of steady running movement of the rollers. Moreover, the rollers in the circulating circuit may be easily varies in number.

Nevertheless, the retainer constructed as stated just earlier, as being made to cover the overall axial length of the roller, needs the circulating circuit larger in diametral dimension of a passage caliber, making the linear guide unit itself greater in construction. This means that the prior retainer as recited earlier also is not suited to shrink the linear guide unit in construction. The retainer made at the leading edge thereof with the raised portion while cut away partially is intricate in construction, which would need too sophisticated mold cavity in the injection molding process to prepare for the roller very small in diameter. The retainer of the type in which the roller fits with molding, moreover, is not ready for modern operating needs for high traveling speed, high acceleration/deceleration, and so on because a clearance left between the retainer and the roller is so tiny to trend to cause the issue of lubrication failure.

Another sort of linear motion guide means is disclosed in the Japanese Patent Laid-Open No. S50-130952, in which a part having a flat race surface is supported for reciprocating movement in longitudinal direction on a guide member. With the prior linear motion guide unit recited here, the rolling elements are successive in series inside the circulating circuit in a way each couple of any leading and trailing rolling elements is held within a common retainer high in mechanical stiffness. The retainer is made of metal sheet and composed of two circular portions each made curved in conformity with a circular outside surface of the rolling element and connected with one another, and an axial web disposed between the forward and aft circular portions to space the leading and trailing rollers away from one another. The retainer is constructed to guide the leading and trailing rolling elements with keeping their axes parallel with each other, while making certain of protecting securely the rolling elements against falling away from the retainer. Moreover, the retainer has guide portions extending sidewise beyond the axially opposite ends of the rolling element and bending at forward and aft ends thereof into U-shape. The retainer is allowed to run through the circulating circuit as the guide portions fit for sliding movement into grooves cut in widthwise opposite sides of the circulating circuit.

However, the linear motion guide unit constructed as stated just above also is not suited to shrink the linear guide unit in construction, because the retainer has the guide portions bent into U-shape that would need to make the grooves in the circulating circuit much larger. The retainer itself is extremely intricate in construction, which would need very sophisticated mold cavity in the injection molding process. In addition, the prior retainer recited just above, since made stiff or rigid in construction, is unsuited for smooth traveling to negotiate easily the turnaround passage curved sharply.

A further another sort of linear motion guide means is disclosed in the Japanese Patent No. 3343195, in which a roller chain is installed in a circulating circuit defined inside a slider that is allowed to move along and relatively to a guide rail. The roller chain gets looped to fit into the circulating circuit inside the slider. The roller chain is composed of many rollers, spacers each interposed between any two adjacent rollers, and flexible belts lying in sidewise opposition and integral with the spacers to connect them through the flexible belts to keep the rollers in rolling contact around their circular outside surfaces with their leading and trailing spacers, thereby making the rollers parallel with one another between their associated leading and trailing spacers.

With the roller chain of synthetic resin in which the spacers are integral with the lengthwise belts to form a molded product like a ladder and the rollers are each held between any leading and trailing spacers in succession inside the ladder, nevertheless, installation of the rollers inside the chain or ladder has to be performed by either molding the rollers themselves integrally with the chain or placing the rollers between any associated leading and trailing spacers after having molded the chain. In case where rollers are each placed between any leading and trailing spacers that have been molded in advance of installation of the rollers, any window to fit the roller therein has to be necessarily made at the same time molding the chain or ladder. To this end, an additional core must be placed in the mold cavity to provide the window after having withdrawn out of between any two adjacent spacers. This necessity of the additional core would often create a collateral problem of raising intricacy of assembled molds to withdraw successfully the cores without any interference with their associated spacers. Otherwise, it would be needed to extract the core out of the chain or ladder while making the associated leading and trailing spacers distorted by force. This forced extraction of the cores could likely cause either any permanent distortion or any damage in the chain or ladder. Forced extraction of the cores, moreover, would raise the issue negatively affecting the service life of the chain or ladder. The roller chain or chain retainer constructed as recited above, since moving in and out with high velocity while following the high-speed reciprocating motion of the slider, is always experience intense stress repetition of bending-stretching-compression and therefore more likely to shear off. Furthermore, the chain retainer, although made of synthetic resin rich in flexibility, is ready to swell with water, oil, and so on, thereby more likely to shear off.

The linear motion guide unit whose retainer fits into the circulating circuit in the slider is needed to meet a variety of requisites, the more important being to make the linear motion guide unit itself higher in mechanical stiffness or rigidity, to render the slider more withstanding against high-speed sliding operation relatively to the guide rail and high acceleration/deceleration relatively to the guide rail, to make the retainer possible to reserve lubricant therein, and to guide the rollers in good rolling order without leaning in rolling posture.

Aspects to be considered to cope with the requisites as stated earlier include the following:

(1) More stiffness in the linear motion guide unit can be accomplished with the guide rail that is designed to receive more rollers as many as permitted to carry the load, thereby providing the load-carrying race as long as possible.

(2) More withstanding property against high-speed and high acceleration/deceleration operations may be realized by the retainer that is refined in construction not to suffer any forced stress.

(3) The cylindrical rollers have higher tendency to displace much lubricant from the load-carrying race in the circulating circuit compared with balls, it is more needed to sustain more lubricant in the recirculating circuit for the rollers than for the balls, and moreover reserve much lubricant inside the retainer by itself.

(4) The rollers have to be not only born against their circular rolling surfaces, but also guided in sliding manner on their axially opposite ends.

SUMMARY OF THE INVENTION

The present invention has for its primary object to meet the four requisites as recited earlier, and to provide a linear motion guide unit having a retainer therein, the retainer having a lip to keep a roller in place, which is made not to experience any distortion and/or damage when a core is withdrawn from the retainer after molding operation, the lip also serving a variety of functions including coming into certain engagement with a rolling surface around the roller to retain the roller in place with steadiness, sustaining ample lubricant there, and rendering a mold cavity simple in construction, thereby making it easier to mold or cast the retainer with accuracy. The present invention also provides a linear motion guide unit having a retainer, in which the roller is allowed to roll with smoothness and high operating speed, but without exerting any unsuited stress on the retainer. Moreover, the present invention provides a linear motion guide unit having a retainer therein, in which the retainer is kept with a retainer plate in a slider so as to ensure a load-carrying race as long as allowed, and the retainer is formed to retain the rollers as many as possible.

The present invention is concerned with a linear motion guide unit with a retainer; comprising an elongated guide rail having a first raceway surface extending lengthwise of the guide rail, and a slider having a second raceway surface in opposition to the first raceway surface, the slider being allowed to move relatively of the elongated guide rail by virtue of a rolling element of roller, which rolls through a race defined between the first and second raceway surfaces; wherein there is provided the retainer to accommodate a roller therein, at least one every one retainer; wherein the retainer is composed of a pair of embracing parts making contact with a rolling surface of the roller at diametrically opposite sides thereof, and a pair of connecting flanges lying above axially opposite ends of the roller and connecting integrally the embracing parts with each other; wherein the embracing parts are each made with at least one lip raised above any one side of the associated embracing part to come into contact with the roller, and at least one second lip raised above another side of the associated embracing part to come into contact with the roller; and wherein the first and second lips are placed in a staggered relation with one another in lengthwise direction of the embracing parts.

In one aspect of the present invention, a linear motion guide unit is disclosed in which the connecting flanges of a retainer are each made of a plate member of a width not more than a third a diameter of the roller.

In another aspect of the present invention, a linear motion guide unit is disclosed in which the embracing parts opposite diametrically of the retainer each have an outward surface that is made flat so that any two adjacent retainers are allowed to come into snugly close-contact with one another while moving one after another in successive array.

In another aspect of the present invention, a linear motion guide unit is disclosed in which the connecting flanges fit into guide grooves cut into a circulating circuit where the roller is allowed to roll through there, to be guided along the guide grooves as the roller runs through the circulating circuit.

In another aspect of the present invention, a linear motion guide unit is disclosed in which a measurement of a clearance left between diametrically opposing first lips is made smaller than that of another clearance between the diametrically opposing second lips, and wherein the first lips move nearer the guide rail while the second lips move nearer the slider.

In another aspect of the present invention, a linear motion guide unit is disclosed in which the first lips are made at two locations spaced away from one another to retain the roller at opposite ends thereof spaced away each other in axial direction, while the second lips are made at one location complementary to the first lips to retain the roller at a middle area lying between the opposite ends thereof.

In another aspect of the present invention, a linear motion guide unit is disclosed in which the embracing part is made with a lubricant reservoir, which also functions as a relief for easy withdrawal of the retainer out of a mold on molding operation, on a side of the second lip in opposition to the first lip, and further made with another lubricant reservoir on a side of the first lip in opposition to the second lip.

In another aspect of the present invention, a linear motion guide unit is disclosed in which the connecting flanges fit into guide grooves cut into a circulating circuit where the roller is allowed to roll through there, to be guided along the guide grooves as the roller runs through the circulating circuit, and wherein the connecting flanges are each made lopsided out of an axial center of the roller.

In another aspect of the present invention, a linear motion guide unit is disclosed in which a circular surface inside the second lip of the embracing part is made larger in a radius of curvature than that a circular surface inside the first lip of the embracing part.

In another aspect of the present invention, a linear motion guide unit is disclosed in which the retainer receives more than one roller for rotation therein and has the connecting flanges made rich in flexibility. As an alternative, the connecting flanges rich in flexibility extend to span across the more than one roller in a shape curved to make an arched area.

In another aspect of the present invention, a linear motion guide unit is disclosed in which the slider is comprised of a carriage made therein with a return passage extending lengthwise in parallel with a load-carrying race defined between the first raceway surface on the guide rail and their opposing raceway surface on the slider, end caps arranged on forward and aft ends of the carriage and made therein with turnaround passages to communicate the load-carrying race with the return passage, and wherein the retainer harboring more than one roller therein is allowed to travel through a circulating circuit composed of the load-carrying race, return passage and paired turnaround passages.

In a further another aspect of the present invention a linear motion guide unit is disclosed in which the embracing part fits into the circulating circuit in a way the first lip travels on the outside of the circulating circuit while the second lip runs on the inside of the circulating circuit, and wherein there is left a clearance between the second lip and the rolling surface of the roller.

In another aspect of the present invention a linear motion guide unit is disclosed in which the return passage is provided by a hole rectangular in transverse section defined inside a tubular composition that fits into a bore made in the carriage, and the tubular composition is composed of a tubular skeleton having therein a lengthwise window made open from a circular surface thereof to the return passage, and a molded member extending lengthwise to fit into the window in the tubular skeleton to provide a return race for the return passage, the molded member being made of a cellular material adapted to be impregnated with lubricant.

In another aspect of the present invention, a linear motion guide unit is disclosed in which the tubular skeleton is made of synthetic resin while the cellular member is made of sintered resinous material.

In another aspect of the present invention a linear motion guide unit is disclosed in which the retainer in the load-carrying race is carried for movement at the connecting flanges thereof by some retainer plates secured to the slider.

In a further another aspect of the present invention, a linear motion guide unit is disclosed in which the roller in the load-carrying race is guided in sliding manner on any one of axially opposite ends thereof along a guide surface made in the carriage of the slider.

In a further another aspect of the present invention a linear motion guide unit is disclosed in which the retainer plates secured to the slider are composed of an upside retainer plate, a middle retainer plate and a downside retainer plate, and wherein the retainer plates fit into any one of recess and setback, which are cut into the carriage simultaneously with cutting of the race into the carriage of the slider.

In another aspect of the present invention, a linear motion guide unit is disclosed in which the embracing parts and the connecting flanges are both made integrally with synthetic resin, and wherein a pocket defined by the embracing parts together with the connecting flanges to fit over the roller is produced with a mold that is divided into some parts.

With the linear motion guide unit with the retainer constructed as stated earlier, the first and second lips made staggered with each other lengthwise of the embracing parts come into engagement with the roller in a way the first lip bears any one side of the roller while the second lip bears another side of the roller, thereby making certain of steady bearing of the roller on either sides thereof. Even upon production of the retainer with using the mold where at least two mold sections or mold halves are retracted in opposite directions to remove the molded retainer out of the mold cavity, especially, the first and second lips staggered with one another on the embracing parts are allowed to escape any interference with the mold opened away from the embracing parts, which might otherwise cause any damage or undesirable stress on the first and second lips owing to the unsuited force raised from the withdrawal of the mold sections. Thus, the first and second lips of the present invention are ensured to have their desired shape with accuracy. Moreover, anywhere other than the first and second lips on the embracing parts has the functions of the relief for easy withdrawal of the mold sections to open the mold cavity for removal of the molded retainer out of the mold cavity as well as the lubricant reservoir that can apply ample lubricant to the load-carrying race so as not to cause no lubrication failure. Thus, the linear motion guide unit of the present invention may be expected to better live up to various operating performances including high precision, high stiffness, high sliding velocity, high acceleration/deceleration, less noise, and so on.

DETAILED DESCRIPTION OF THE PREFERRED EMBODIMENTS

Figure 1:
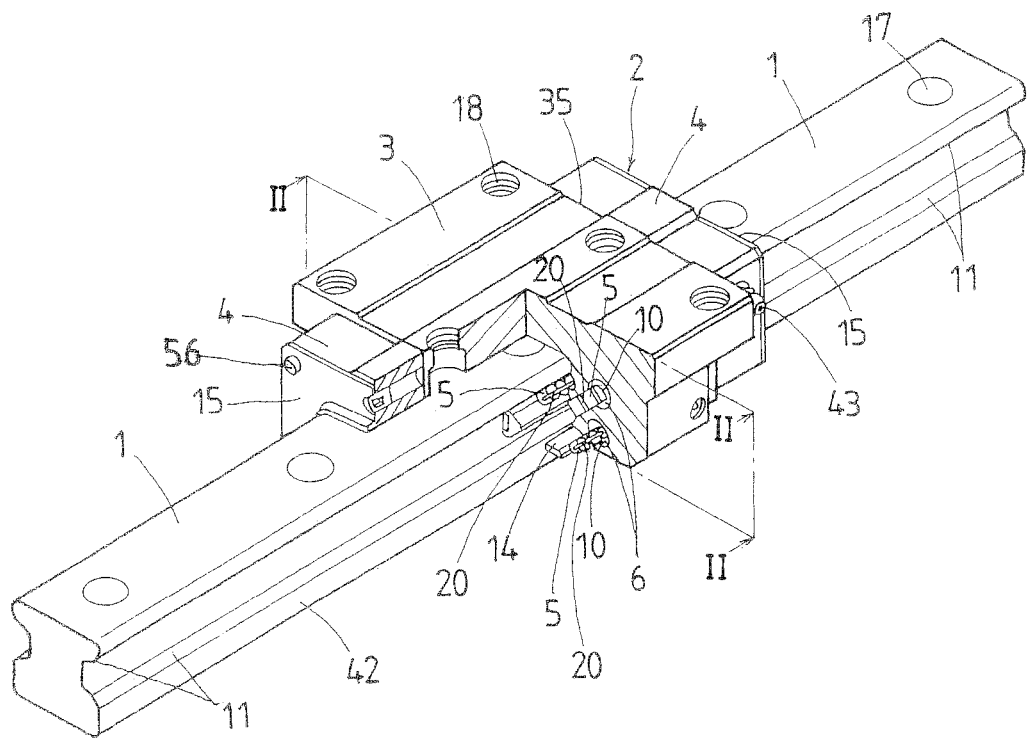
FIG. 1 is a partially cutaway view in perspective illustrating a preferred embodiment of a linear motion guide unit having a retainer according to the present invention.

The linear motion guide unit according to the present invention is adapted for use in any relatively sliding components in machinery as diverse as semiconductor processing machines, various assembling machines, precision machines, measurement/inspection instruments, medical instruments, micromachines, machine tools, and so on.

Referring now in detail to the drawings, the linear motion guide unit according to the present invention will be explained below. The linear motion guide unit of the present invention features that there is provided therein a retainer 20 used to space adjacent cylindrical rollers 5 for rolling element from each other to keep constantly the rollers 5 against direct engagement with one another, thereby making sure of various operating performances including high precision, high stiffness, high sliding velocity, high acceleration/deceleration, less noise, and so on. The retainer 20 adopted in the linear motion guide unit of the present invention, although used commonly to retain the cylindrical rollers 5 in place in a diversity of linear motion guide units of the type sometime called "finite linear motion guide unit" because of their construction where the rollers for rolling element are allowed to roll over only a definite travel instead of rolling through a recirculation circuit, finds the best application in the linear motion guide unit of the construction whose slider fits over a guide rail for linear movement through the cylindrical rollers. Thus, the present invention will be disclosed later with reference to some versions of the linear motion guide unit whose slider fits over a guide rail for linear movement through the cylindrical rollers.

Referring to FIGS. 1 to 4, there is shown the retainer 20 to be installed in the linear motion guide unit in which more than one roller 5 serves as rolling element. The linear motion guide unit is mainly comprised of an elongated guide rail 1 made on widthwise opposite sides 42 thereof with paired lengthwise raceway surfaces 11, a slider 2 having raceway surfaces 12 in opposition to raceway surfaces 11 cut in the guide rail 1, and more than one roller 5 allowed to roll between the raceway surfaces 11 and 12 together with a retainer 20 that fits over the associated roller 5. The slider 2 is comprised of a carriage 3 made therein with paired return passages 10 extending lengthwise in parallel with upside and downside load-carrying races 34 defined between the raceway surfaces 11 on the guide rail 1 and their opposing raceway surfaces 12 on the slider 2, end caps 4 arranged on forward and aft ends 35 of the carriage 3 and made therein with turnaround passages 30, refer to FIG. 10, to communicate the load-carrying races 34 with their associated return passages 10, and end seals 15 attached to outward end surfaces of the end caps 4. The end caps 4 and end seals 15 are both secured to the carriage 3 with using fastening bolts 56. The guide rail 1 is made with some holes 17 that are used to fasten the guide rail 1 to any stationary bed including machine bed, mounting base, workbench, and so on, while the carriage 3 of the slider 2 is made with threaded holes 18 that are used to install any object including various instruments, works, attachments, and so on thereon. Moreover, the end caps 4 are each made therein with the lubrication port, grease nipple 43, and so on to feed lubricant.

With the linear motion guide unit constructed as stated earlier, more than one roller 5 rolls through any one of paired circulating circuits 52, with accommodated in the retainer 20. The paired circulating circuits 52 are made intersected with one another in a staggered relation at the turnaround passages 30 in such a way that the rollers 5 rolling through the upside load-carrying race 34 enter the downside return passage 10 while other rollers 5 running through the downside load-carrying race 34 enter the upside return passage 10 as the slider 2 moves relatively to the guide rail 1. With the linear motion guide unit of the present invention, moreover, a tubular composition 6 fits lengthwise into a fore-and-aft bore 9 in the carriage 3 in a way a central axial hole inside the tubular composition 6 defines the return passage 10. The tubular composition 6 is formed in a circular contour as a whole viewed in transverse section, while the central axial hole inside the tubular composition 6 is formed to have a rectangular configuration in transverse section to allow the roller 5 rolling through there. The return passage 10 provided by the central axial hole inside the tubular composition 6 is made into a rectangular shape in transverse section, which is somewhat larger in transverse section to allow the roller 5 together with the retainer 20 rolling through the return passage 10.

The tubular composition 6 is made up of a tubular skeleton 7 having a window 54 made open to the return passage 10 from a circular outside surface, and a cellular member 8 that fits into the associated window 54, the cellular member 8 being able to be impregnated with lubricant to fill cells or pores in the cellular member 8. The tubular skeleton 7 and the cellular member 8 are both ready for providing a return race 55 that makes rolling-contact with the rolling surfaces 39 of the rollers 5. The tubular skeleton 7 is made of any synthetic resin that is rich in mechanical stiffness or strength enough to make certain of steady circulation of the rollers 5 for a long-lasting service life. The cellular member 8 is made of any sintered resinous material of cellular or porous structure that is better in absorption, retention and delivery of lubricant. The tubular skeleton 7 is further made with a lengthwise groove 53 to guide a connecting flange 24 of the retainer 20 through the return passage 10.

Figure 10:
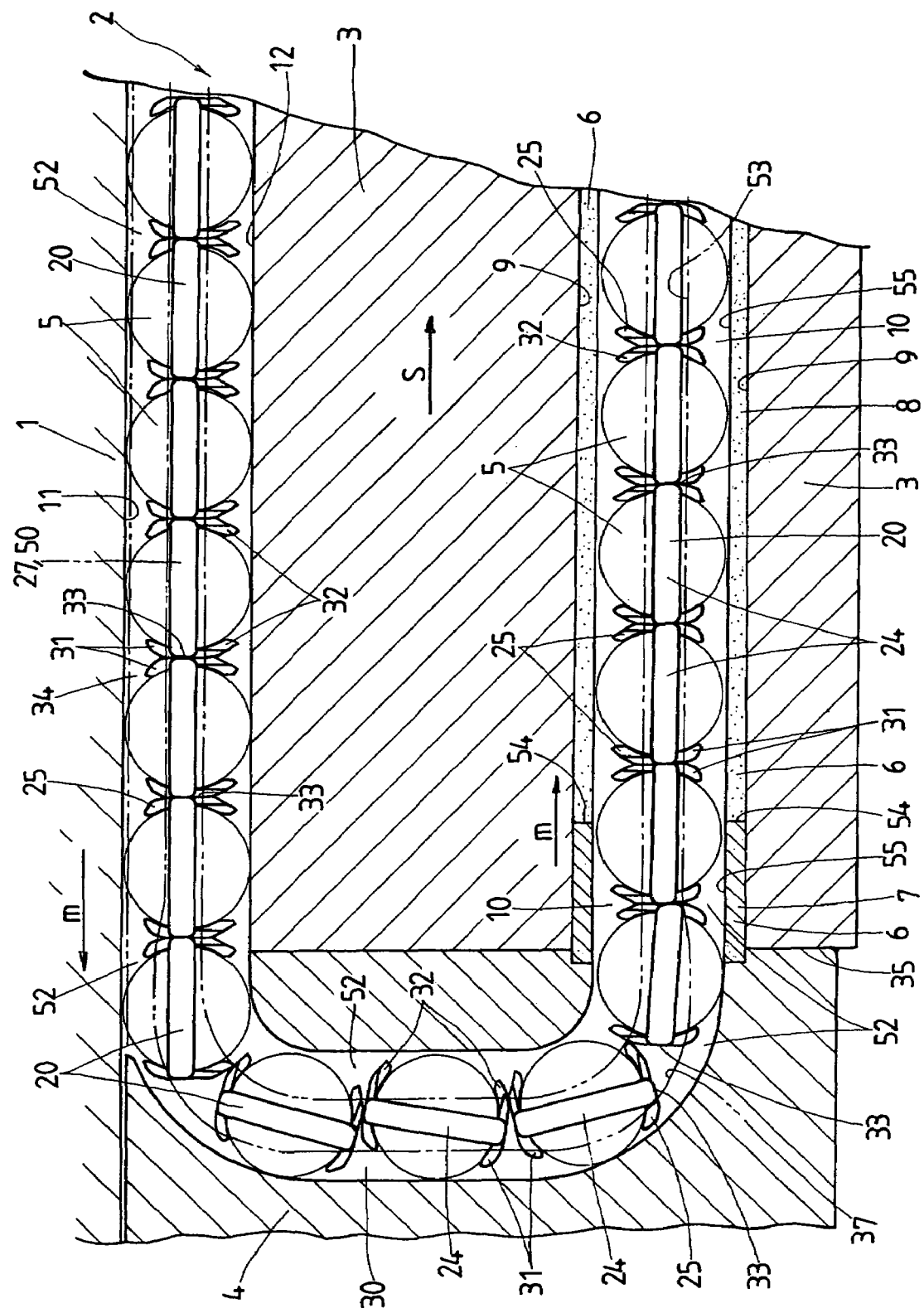
FIG. 10 is a fragmentary view in longitudinal section of the linear motion guide unit in which the retainers shown in FIGS. 4 to 9 are built in a circulating circuit in the linear motion guide unit of the present invention.

With the linear motion guide unit of the present invention, paired circulating circuits 52, refer to FIG. 10, in any one of sidewise opposite portions of the slider 2 are made intersected with one another in a staggered relation at the turnaround passages 30 in such a way that the rollers 5 rolling through the upside load-carrying race 34 enter the downside return passage 10 while other rollers 5 running through the downside load-carrying race 34 enter the upside return passage 10 as the slider 2 moves relatively to the guide rail 1. Thus, the linear motion guide unit constructed as stated earlier, in all, has four rows of the circulating circuits 52, each of which is made up of the load-carrying race 34, and a non-loaded area including the return passage 10 bored in the carriage 3 and forward and aft turnaround passages 30 made in the end caps 4. There are moreover provided retainer plates 13, 21 and 22 in the slider 2. Of the retainer plates 13, 21 and 22, the retainer plates 13 and 21 fit into recesses 26 and 46, refer to FIG. 3, cut deep in the carriage 3, while the retainer plate 22 comes into engagement with a shoulder 23 made on the carriage 3. The upside retainer plate 21 fits into the recess 26 in the carriage 3 of the slider 2 in an arrangement extending next to the upside raceway surface 12 that is made in any one of sidewise opposite portions 16 of the carriage 3. The middle retainer plate 13 is secured to the slider 2 by fitting into the recess 46 that is cut between the upside and downside raceway surfaces 12 on the carriage 3. The downside retainer plate 22 is secured to the slider 2 by making engagement with the shoulder 23 of the carriage 3 in a relation extending next to the downside raceway surface 12 that is made in any one of sidewise opposite portions 16 of the carriage 3. Thus, the retainer plates 13, 21 and 22 are fastened firmly to the carriage 3 to work in combination with one another to guide the retainers 20 with accuracy. The recesses 26, 46 and shoulder 23 are cut accurately on turning operation simultaneously with the raceway surfaces 12 on the carriage 3. Thus, the retainers 20 harboring the rollers 5 therein are allowed to move through the load-carrying race 34 with their connecting flanges 24 being born against the retainer plates 13, 21 and 22 in the slider 2.

Referring next to FIGS. 4 to 10, there is shown a preferred version of the retainer 20 to be assembled into the linear motion guide unit of the design where the rollers 5 fit in the retainers 20, at least one roller in every retainer. The retainer 20 is adapted to fit into the circulating circuit 52 in the linear motion guide unit for running through there in lengthwise direction. The retainer 20 is provided therein with a pocket 36 made to fit over the roller 5 for free rotation, and composed of a pair of embracing parts 25 making contact with the rolling surface 39 of the roller 5 at diametrically opposite sides thereof, and a pair of connecting flanges 24 lying above axially opposite ends 40 of the roller 5 and connecting integrally the embracing parts 25 with each other. The connecting flanges 24 are constructed in a geometry that the inside measurement(Pb) between inward surfaces of the connecting flanges 24 is of a dimension enough to set the roller 5 into the retainer 20, while the outside measurement(B) between outward surfaces of the connecting flanges 24 is of a dimension enough to allow the retainer 20 to run through the central axial bore inside the tubular composition 6.

Figure 5:
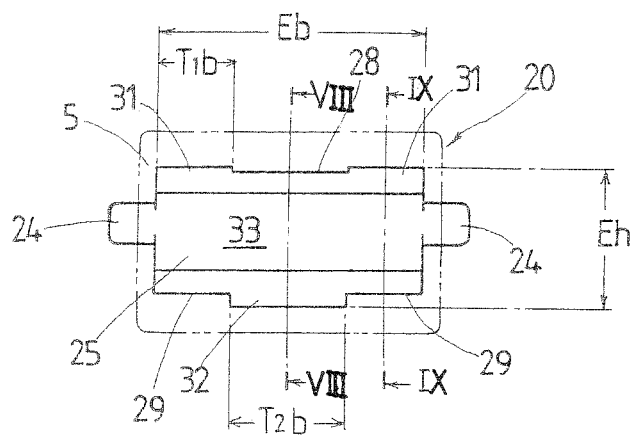
FIG. 5 is a view in side elevation of the retainer of FIG. 4.
Figure 6:
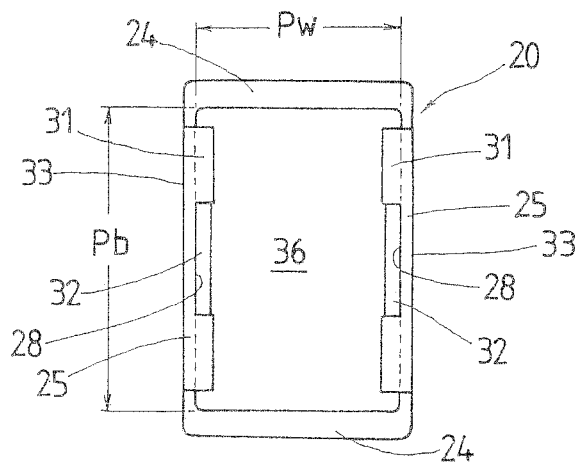
FIG. 6 is a view in plan of the retainer of FIG. 4.
Figure 7:
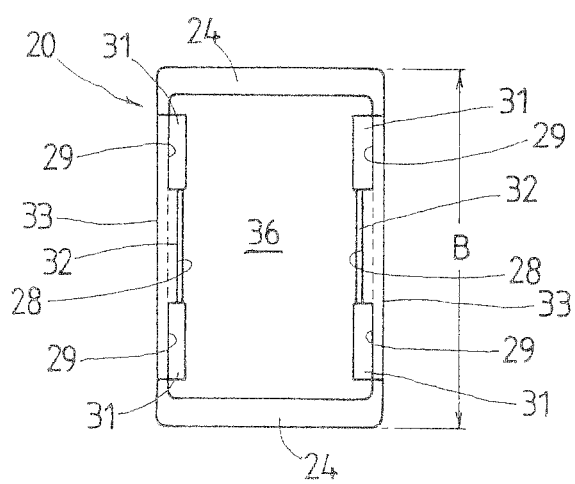
FIG. 7 is a view in bottom showing the retainer of FIG. 4.

The embracing parts 25 of the retainer 20 to hold the roller 5 between them from diametrically opposite sides thereof are each made up of a middle column 33, at least one first lip 31, two lips shown in FIG. 5, raised above any one side of the middle column 33, and at least one second lip 31, one lip shown in FIG. 5, raised above another side of the middle column 33. The first and second lips 31 and 32 raised in opposite direction with respect to the middle column 33 are placed in an offset or staggered relation with one another in lengthwise direction of the embracing part 25 or in axial direction of the roller 5. Locations 28, 29 anywhere other than the lips 31 and 32 are envisaged serving as lubricant reservoirs and relieves for easy withdrawal of the molded retainer out of the mold cavity. With the retainer 20 constructed according to the version described now, the first lips 31 raised above the embracing part 25 are made at two locations spaced away from one another in longitudinal direction of the retainer 20 to retain the roller 5 at opposite ends thereof spaced away each other in axial direction, while the second lip 32 raised in opposite direction to the first lips 31 is made at one location complementary to the first lips 31 to retain the roller 5 at a middle area lying between the opposite ends thereof. On the embracing part 25 of the retainer 20, the lubricant reservoirs 28 is flanked by the first lips 31 for any one side of the embracing part 25, and vice versa for other side, the second lip 32 is flanked by other lubricant reservoirs 29.

Molding operation of synthetic resin is available to make the retainer 20 in which the embracing parts 25 are integral with the connecting flanges 24. The mold is usually divided into some parts to form the pocket 36 to receive the roller 5 therein, which is surrounded with the embracing parts 25 and the connecting flanges 24. With the molding operation to produce the retainer 20, there is usually used the mold consisting of two parts simple in construction: the upper section and bottom section. When the mold is opened and the molded retainer 20 removed, the upper section is retracted upwards to leave the lubricant reservoir 28 and the lips 31, and vice versa the bottom section is withdrawn downwards to leave the lubricant reservoirs 29 and the lips 32. Thus, the lips 31 and 32 experience no stress upon withdrawal of the molded retainer 20 out of the mold cavity, and therefore are made precisely into the desired shape without suffering any distortion or damage.

Figure 3:
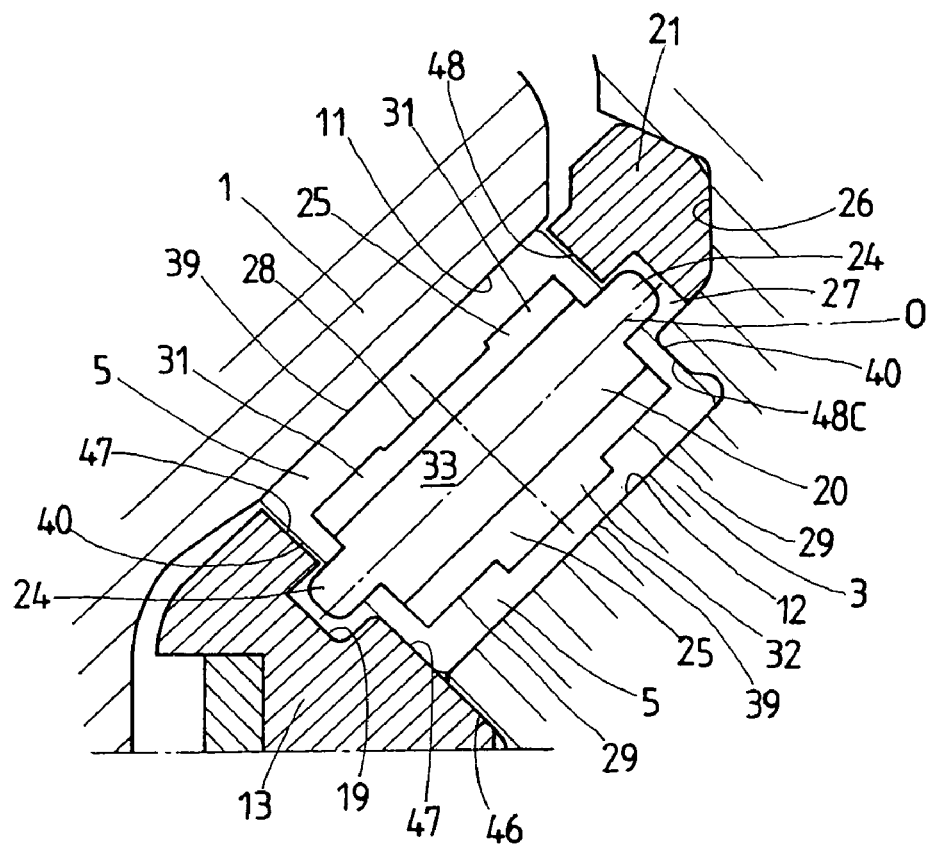
FIG. 3 is an enlarged fragmentary view in transverse section of a part encircled with(F) in FIG. 2.

The rollers 5 in the load-carrying races 34 are born against the any one of guide surfaces 48C and 49C at any one of their axially opposite ends 40 to be guided in sliding manner along the guide surfaces 48C and 49C. Especially, the roller 5 in the upside load-carrying race 34 is guided at any one of the axially opposite ends thereof by a guide surface 47 of the retainer plate 13 while at another end by in part a guide surface 48 of the retainer plate 21 and in other part the guide surface 48C of the carriage 3. In the downside load-carrying race 34, the roller 5 is guided at any one of the axially opposite ends thereof by another guide surface 47 of the retainer plate 13 while at another end by in part a guide surface 49 of the retainer plate 22 and in other part the guide surface 49C of the carriage 3. The retainer 20 harboring the roller 5 therein in the upside load-carrying race 34, as shown in FIG. 3, is allowed to run through the upside load-carrying race 34 with any one of sidewise opposite connecting flanges 24 thereof fitting into a guide groove 19 cut deep in the retainer plate 13 and another connecting flange 24 fitting into a guide groove 27 that is defined between the retainer plate 21 and the recess 26 in the carriage 3. With the retainer 20 in the downside load-carrying race 34, any one of the sidewise opposite connecting flanges 24 is allowed to fit into another guide groove 19 in the retainer plate 13 while another connecting flange 24 fits into a guide groove 50 that is defined between the retainer plate 22 and a recess 51 set back in the carriage 3. The retainer 20 in the load-carrying races 34 makes it possible to get the roller 5 rolling with the overall rolling surface 39 thereof keeping close rolling-contact with the race surfaces 11, 12, thereby making the load-carrying length of the roller 5 greater to increase the rolling-contact length of the rolling surface 39 of the roller with the race surfaces 11, 12.

Figure 4:
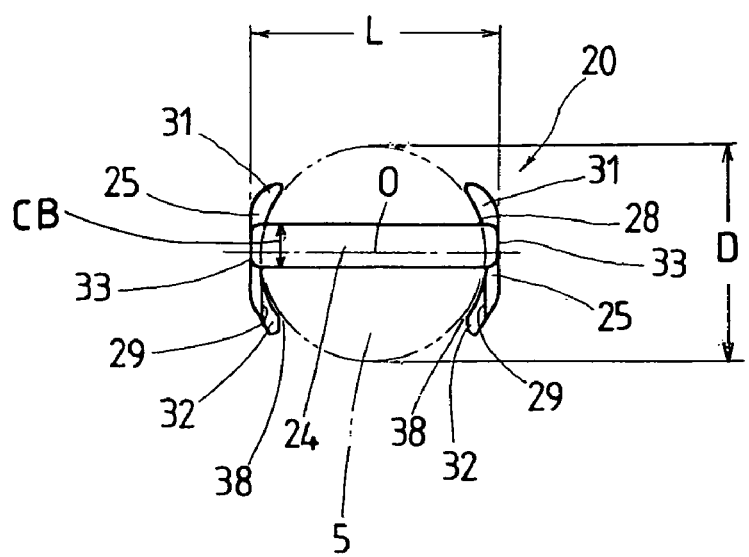
FIG. 4 is a view in front elevation of a preferred embodiment of the retainer to be assembled into the linear motion guide unit of FIG. 1.

The retainer 20 is to hold the roller 5 for rotation in the pocket 36 that is surrounded with the embracing parts 25 and the connecting flanges 24. With the retainer 20 constructed as stated earlier, the connecting flanges 24 integral firmly with the paired embracing parts 25 are made to expose the axially opposite ends 40 of the associated roller 5 as large as possible to allow the roller 5 coming into rolling contact with the guide surfaces 47 to 49 of the load-carrying races at the axially opposite ends 40 thereof, thereby moving without leaning in rolling posture. To this end, the connecting flanges 24 as shown in FIG. 4 are each made of a plate member of a width(CB) not more than a third the diameter(D) of the roller 5. The embracing parts 25 opposite diametrically of the retainer 20 each have an outward surface 33 that is made flat so that any two adjacent retainers 20 are allowed to come into snugly close-contact with one another while moving one after another in successive array. The retainer 20 is defined in such a dimension that an outside measurement across the flat outward surfaces 33 of the diametrically opposite embracing parts 25 parallels a diametral length(L) of the retainer 20. Giving the flat outward surfaces 33 on the diametrically opposite embracing parts 25 makes it easier to render the retainer length(L) as less as possible, helping lessen a space between any leading and trailing rollers 5 in the circulating circuit 52 as shown in FIG. 10, thereby making it possible to admit a great many load-carrying rollers 5 into the circulating circuit 52. In FIG. 10, a sign(m) indicates a moving direction of the rollers 5 while a sing(C) is a traveling direction of the slider 2. The guide surfaces 48C, 49C are machined accurately on cutting operation simultaneously with the raceway surfaces 12 on the carriage 3. The roller 5, as held inside the retainer 20 while moving through the load-carrying races 34, may be made larger in diameter(D) than the conventional one, and therefore helps make the linear motion guide unit higher in mechanical strength compared with the prior units.

Figure 2:
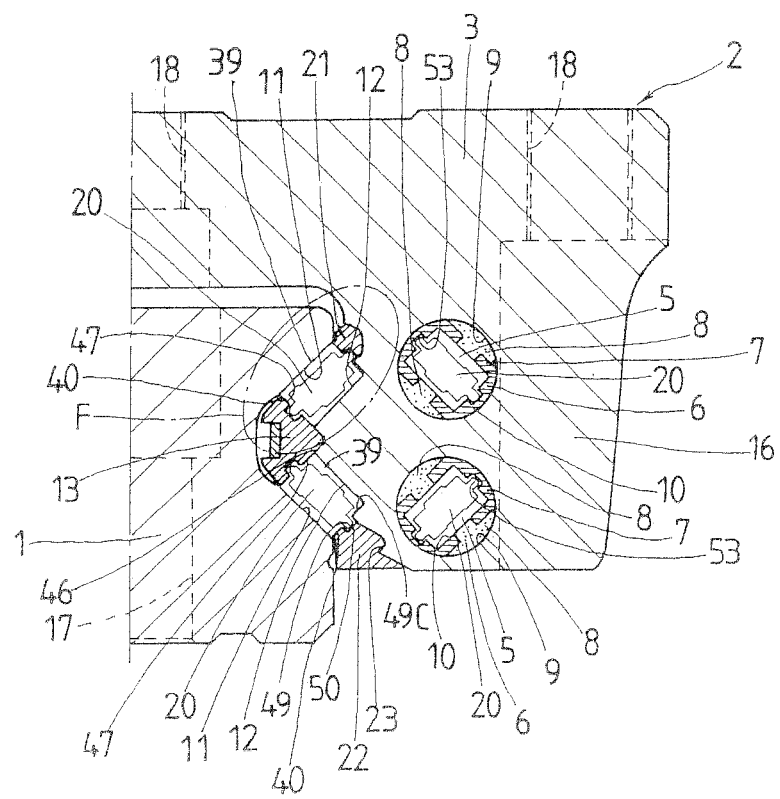
FIG. 2 is a view by half in transverse section along a plane II-II of FIG. 1 showing the linear motion guide unit.
Figure 8:
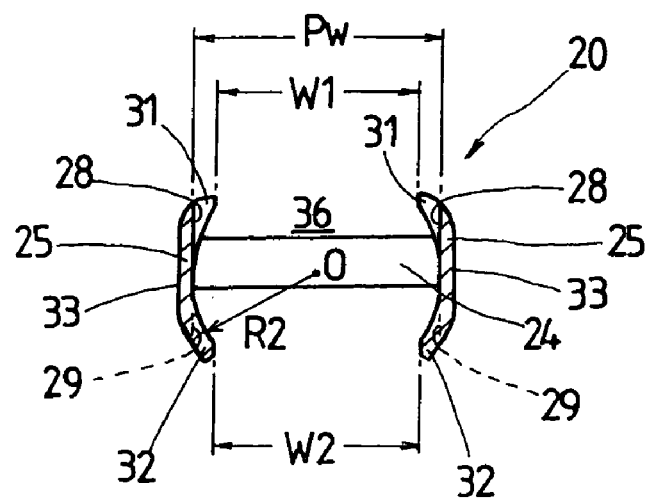
FIG. 8 is a view in transverse section of the retainer and taken on the plane of the line VIII-VIII of FIG. 5.
Figure 9:
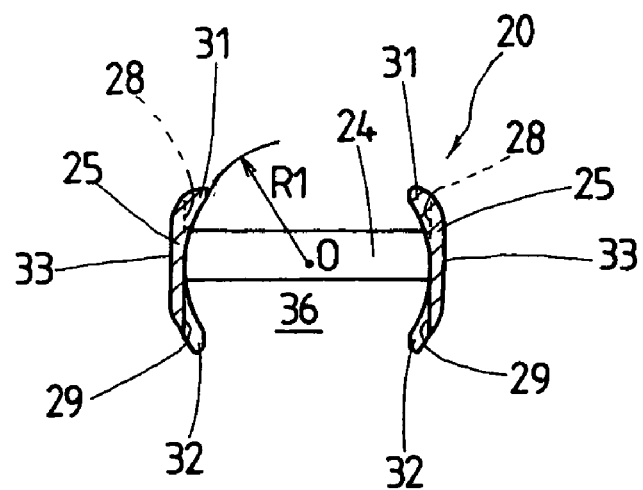
FIG. 9 is a view in transverse section of the retainer on the plane of the line IX-IX of FIG. 5.

The retainers 20, as shown in FIGS. 2, 3 and 10, are guided through the circulating circuit 52, with their connecting flanges 24 fitting into the guide grooves cut deep into the circulating circuit 52. The guide grooves are made up of the guide grooves 19, 27, 50 made in the retainer plates 13, 21, 22 secured to the carriage 3, guide grooves 53 cut in the return passages 10 in the carriage 3, and guide grooves 37 cut in the turnaround passages 30 in the end caps 4. The embracing parts 25 of the retainer 20, as shown in FIGS. 4, 8 and 9, are each made curved in a way following the circular outside surface of the roller 5 when viewed in axial direction of the roller 5. The tips of the embracing parts 25 terminate into the lips 31 and 32. Especially, the embracing parts 25 are raised upwards to terminate into the first lips 31 coming into engagement with the upper half of the roller 5, while raised downwards to terminate the second lips 32 coming into engagement with the lower half of the roller 5. The embracing parts 25 are each made less in an axial length(Eb) than an axial length of the rolling surface of the roller 5, while less in an overall height(Eh) than a diameter(D) of the roller 5.

With the retainer 20 constructed as stated, the first lip 31 and the second lip 32 may be made either different or identical with one another in their lengths(T1b) and (T2b) in the axial direction of the roller 5. Especially, the first lip 31 is made to have the length(T1b) smaller than that of the lubricant reservoir 29, which functions as the relief on the molding operation for easy withdrawal of the molded retainer out of the mold, while the second lip 32 is made have the length(T2b) equal with that of another lubricant reservoir 28, which functions just as well as the lubricant reservoir 29. The lips 31 and 32 constructed to have their lengths as stated earlier with respect to the lubricant reservoirs 28, upon removal of the molded retainer 20 from the mold, cause no interference with any part of the mold, thus making sure of smooth withdrawal of the molded retainer 20 out of the mold cavity. In production of the linear motion guide unit of the present invention, only the retainer 20 is first molded with synthetic resin, and then the roller 5 is fitted into the molded retainer 20. To this end, any core has to be prepared to shape the pocket 36 inside the synthetic resin-made retainer 20 to harbor the roller 5 therein. The core is divided into three parts, for example of two first parts spaced away from one another and adapted to be removed downwards, and one second part flanked by the two first parts and adapted to be removed upwards. The core constructed as stated earlier may be extracted easily from the molded retainer 20 so as not to exert any forced stress over the retainer 20, thereby making certain of producing the retainer 20 with the lips 31, 32 being well preserved in their ideal desired contours.

With the linear motion guide unit constructed as stated earlier, the retainer 20 has a constructional feature that the relieves 29 for easy withdrawal of the first core parts from the molded retainer 20 are made on opposite sides of the second lip 32 raised in opposition to the first lips 31, while another relief 28 for easy withdrawal of the second core part from the molded retainer 20 is made between the paired first lips 31 raised in opposition to the second lip 32, and the relieves 29 and 28 provides the lubricant reservoirs to store ample lubricant there. The retainer 20 has another constructional feature that the lips 31 and 32 are made varied in their circular inside surfaces, which are formed by respective circular outside surfaces of the core different in radius of curvature from one another. In the version shown in FIGS. 8 and 9, the circular inside surface of the first lip 31 has the radius of curvature of (R1) while the circular inside surface of the second lip 32 has the radius of curvature of (R2). An inside measurement between inward surfaces of the lubricant reservoirs 28, 28 opposing across the roller 5 has a distance(Pw), which is equivalent to a radial distance of the pocket 36 and made somewhat larger a diameter(D) of the roller 5. Measurements (W1), (W2) between lips 31, 32 opposite to one another in a radial direction of the pocket 36 is respectively made somewhat smaller than the diameter (D) of the roller 5 to keep the roller 5 between diametrically opposed lips 31, 32 so as not to fall away from the embracing parts 25 of the retainer 20. The radius(R1) of curvature of the first lip 31 is made the least permitted to retain the roller 5 for rotation, especially made slightly larger than the radius (D/2) of the roller 5. The radius (R2) of curvature of the second lip 32 is made to leave a clearance 38 away from the roller 5, which is enough to allow any elastic deformation or distortion of the second lip 32. The first and second lips 31, 32 are made to have their radius (R1) and (R2) of curvature, which are set in a relation of R1<R2. It will be understood that the distance(W1) between the first lips 31 opposite to one another in a radial direction of the roller 5 is made smaller than the distance(W2) between the second lips 32 opposing one another because of the relation of the above R1<R2. Thus, the roller 5 is retained predominantly between the first lips 31.

The retainer 20, as shown in FIG. 10, fits into the circulating circuit 52 in a way the first lip 31 travels on the outside while the second lips 32 run on the inside of the circulating circuit 52. The second lips 32 are made longer so as to be rich in flexibility, compared with the first lip 31. Moreover, there is left the clearance 38 between any one of the second lips 32 and the rolling surface 39 of the roller 5. With the retainer 20 constructed as stated just earlier, the roller 5 is hard to slip off from the retainer 20 between the first lips 31 opposing diametrically to one another, while easy to fit into the retainer 20 through between the second lips 32 each of which is located substantially midway between the axially opposite ends of the roller 5. Moreover, the retainer 20 shown in FIG. 10 fits into the circulating circuit 52 in an arrangement that the first lip 31 lies on the outside while the second lips 32 lie on the inside of the circulating circuit 52. This arrangement of the retainer 20 in the circulating circuit 52 makes certain of keeping the rollers 5 against slipping off the load-carrying race 34 even after the slider 2 has been disassembled from the guide rail 1. In addition, even though it would be expected that the leading and trailing retainers 20 come into collision against one another while traveling through the turnaround passage 30, such collision takes place between their second lips 32 whenever any adjacent two retainers 20 come into collision with each other. The approach to the resolution of the collision between the leading and trailing retainers 20 is the clearance 38 left between the second lip 32 and the associated roller 5 to allow the second lip 32 incurring any bending towards the roller 5, easing the variation in traveling through the turnaround passage 30, thereby making sure of smooth rolling of the roller 5 through the circulating circuit 5. The connecting flanges 24 of the retainer 20 are provided to fit into the guide grooves 19, 27, 37 and 53 cut deep in the circulating circuits 52 to guide the rollers 5 throughout the circulating circuits 52. The guide grooves 19-53 are offset out of the axial center(0) of the roller 5 so as to lie on the outside of the circulating circuit 52, helping make the guide surface 48C of the race 34 in the carriage 3 larger in width, thereby making the retainer 20 easier to negotiate the turnaround passage 30. The guide grooves 37, 53 to guide the connecting flanges 24 of the retainer 20, as shown in FIG. 10, are made larger in width at the turnaround passage 30 as well as a transition entering and/or leaving the associated turnaround passage 30 to thereby make the connecting flanges 24 easier to run with smooth through the turnaround passage 30.

Figure 15:
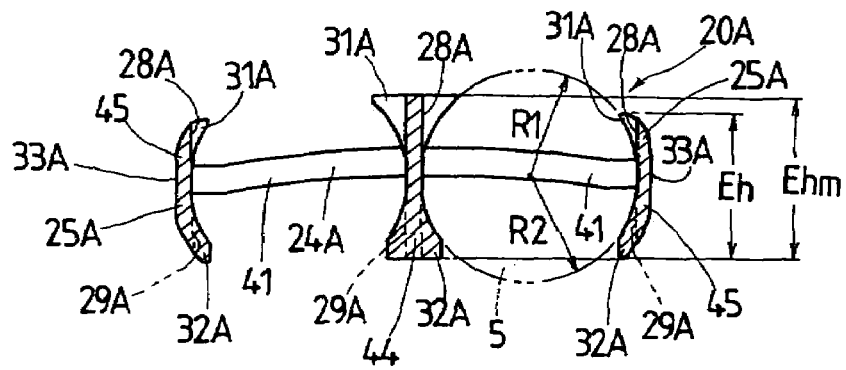
FIG. 15 is a view in transverse section of another version and taken on the plane of the line XV-XV of FIG. 12.
Figure 16:
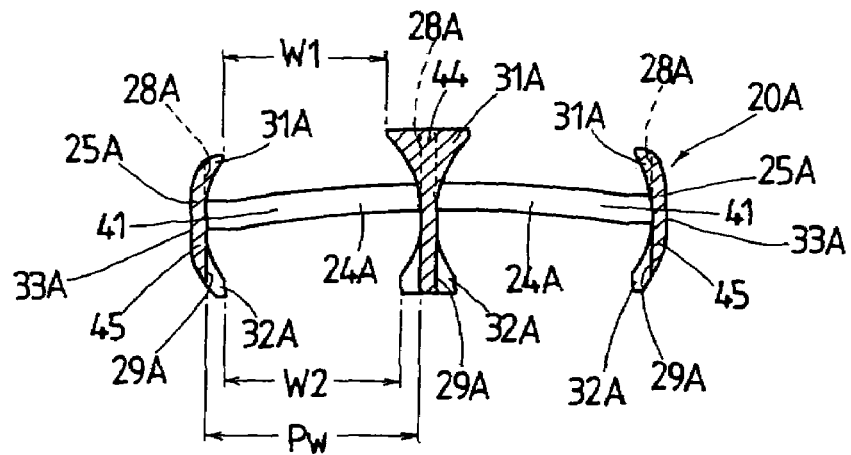
FIG. 16 is a view in transverse section of another version and taken on the plane of the line XVI-XVI of FIG. 12.
Figure 17:
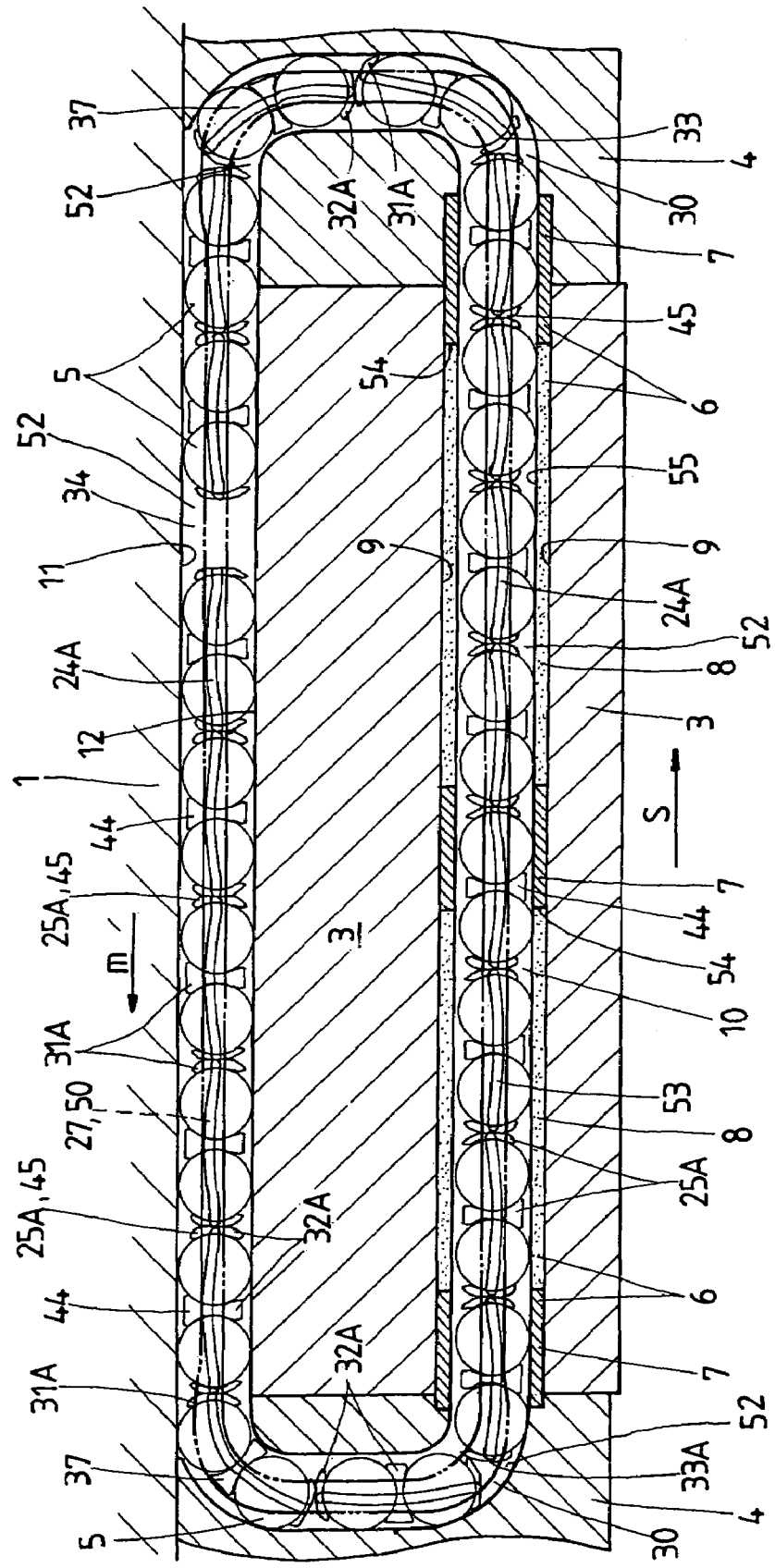
FIG. 17 is a fragmentary view in longitudinal section of the linear motion guide unit in which another version shown in FIGS. 11 to 16 are built in a circulating circuit in the linear motion guide unit of the present invention.

Referring next to FIGS. 11 to 17, there is shown the second version of the linear motion guide unit according to the present invention. A modified retainer 20A adapted to be combined in another version of the linear motion guide unit is substantially similar in function to the previously described retainer 20, but is constructed to retain more than one roller 5 therein. Most of the components of the modified retainer 20A are the same as described previously. To that extent, the components have been given the same characters with the suffix "A", so that the previous description will be equally applicable to an embracing part 25A, connecting flange 24A, lips 31A and 32A, lubricant reservoirs 28A and 29A, middle columns 33A on forward and aft embracing parts 45, pocket 36A and clearance 38A. The modified retainer 20A is shown constructed with forward and aft embracing parts 45 and an intermediate trunk 44 to retain two rollers 5 separately from one another. The retainer 20A may be further modified to retain more than three rollers 5 therein by the increase of the intermediate embracing trunks 44 in number. The modified retainer 20A constructed to hold two rollers 5 for rotation therein has the connecting flanges 24A that are made flexible. The connecting flanges 24A each extend to span across the two rollers 5 in a shape raised towards the first lip 31A to make an arched area 41. Thus, the connecting flanges 24A are allowed to largely warp as shown in FIG. 17 upon the movement through the turnaround passage 30, thereby making even plural rollers 5 easier to roll through the circulating circuit 52 with smoothness. Moreover, the arched area 41 of the connecting flange 24A, since raised or lopsided especially on the outside of the circulating circuit 52, makes the retainer 20 with the rollers 5 easier to negotiate the turnaround passage 30 even with small in the radius of curvature.

Figure 11:
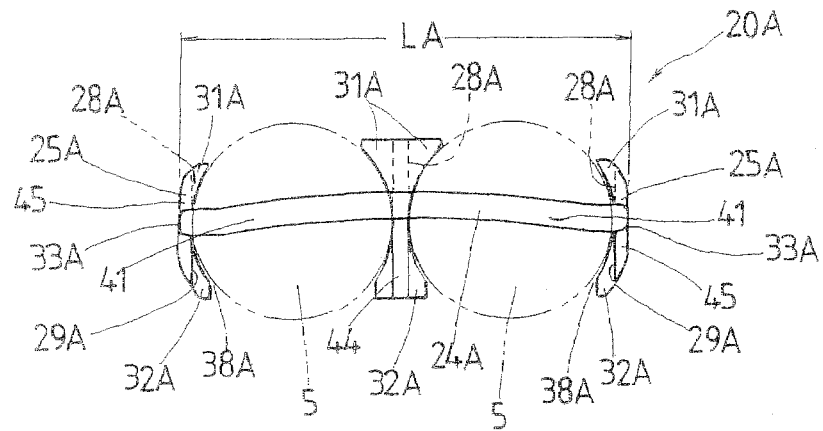
FIG. 11 is a view in front elevation of another version of the retainer to be assembled into the linear motion guide unit of FIG. 1.
Figure 12:
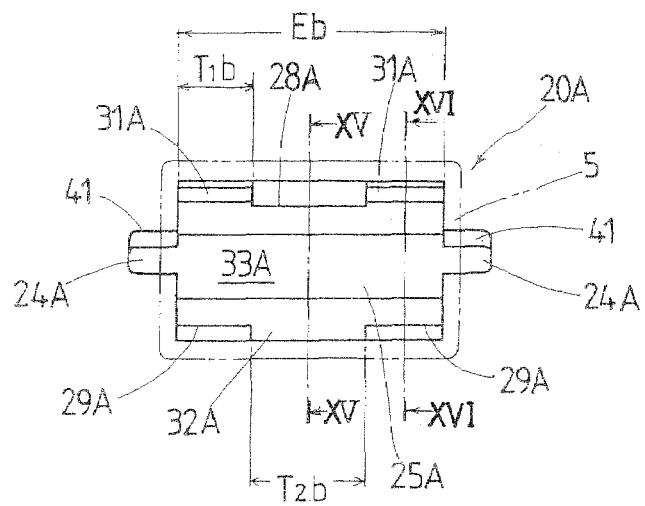
FIG. 12 is a view in side elevation of another version of FIG. 11.
Figure 13:
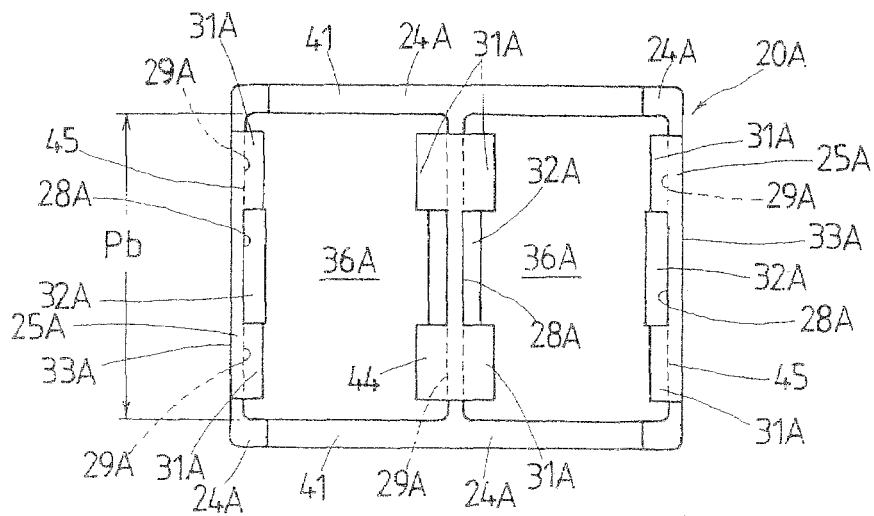
FIG. 13 is a view in plan of another version of FIG. 11.
Figure 14:
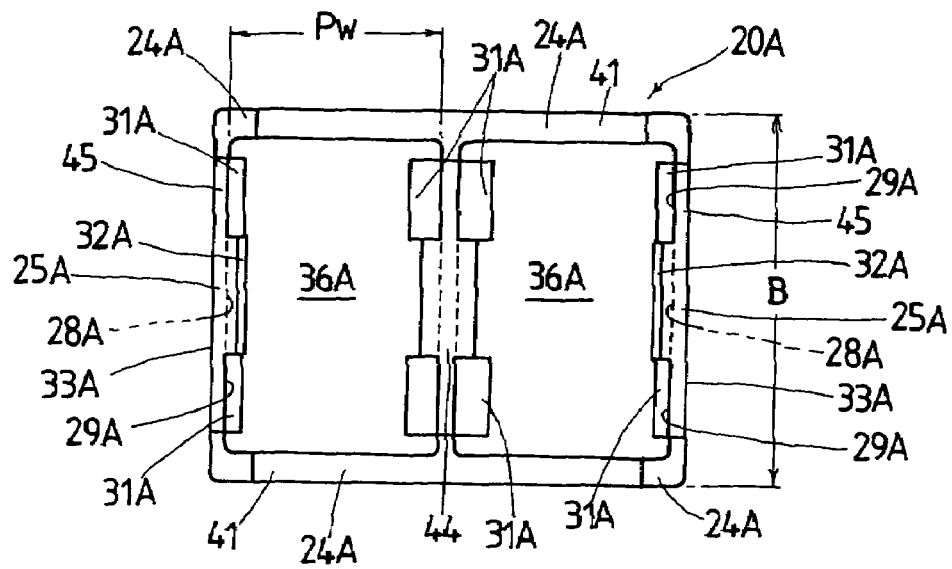
FIG. 14 is a view in bottom of another version of FIG. 11.

With the modified retainer 20A, moreover, there is provided the intermediate trunk 44 between the forward and aft embracing parts 25A to make the pockets 36A to keep the rollers 5 therein against direct rolling-contact with each other. The intermediate trunk 44, as shown in FIGS. 11, 15 and 16, is made concaved on opposite sides thereof when viewed in the axial direction of the roller 5 to provide embracing parts 25A on the opposite sides thereof, which are made concaved to follow their associated rollers 5 to embrace in part the rolling surfaces of the rollers 5. On the opposite sides of the intermediate trunk 44 of the modified retainer 20A, there are provided lips 31A and 31B raised in the circular directions of the rollers 5. The overall length(LA) of the retainer 20A is the outside measurement between outward flat surfaces of middle columns 33A. Lubricant reservoirs 28A, 29A, likewise in the embracing parts 25A, are made on the intermediate trunk 44 at the opposite sides thereof. Circulating circuits 52 in the second version of the liner motion guide unit are identical in construction with the circulating circuits 52 for the first retainer 20. With the linear motion guide unit having the modified retainer 20A constructed as stated earlier, since there is no likelihood of direct metal-to-metal contact between the leading and trailing rollers 5, less noise in operation and less wear of the rollers 5 may be accomplished effectively. The linear motion guide unit according to the second version stated earlier, thus, is more desirable in high precision and high stiffness compared with the conventional linear motion guide unit using cylindrical rollers therein. The linear motion guide unit, moreover, is successful in keeping the retainer 20A against any undue stress even under high sliding velocity, high acceleration/deceleration, as well as in the realization of maintenance-free operation.

What is claimed is:

1. A linear motion guide unit with a retainer; comprising an elongated guide rail having a first raceway surface extending lengthwise of the guide rail, and a slider having a second raceway surface in opposition to the first raceway surface, the slider being allowed to move relatively of the elongated guide rail by virtue of a roller, which rolls through a race defined between the first and second raceway surfaces;

wherein a retainer is provided to accommodate a roller therein;

wherein the retainer has embracing parts which engage a rolling surface of the roller at diametrically opposite sides thereof, and a pair of connecting flanges lying above axially opposite ends of the roller and connecting integrally the embracing parts with each other;

wherein each of the embracing parts are made with first lips raised above any one side of the associated embracing part to come into contact with the roller, and a second lip raised above another side of the associated embracing part to come into contact with the roller;

wherein the first and second lips are placed in a staggered relation with one another in an axial direction of the roller;

wherein the first lips are made at two locations spaced away from one another to retain the roller at opposite ends thereof spaced away each other in axial direction, while the second lip is made at one location complementary to the first lips to retain the roller at a middle area lying between the opposite ends thereof;

wherein the slider is comprised of a carriage made therein with a return passage extending lengthwise in parallel with a load-carrying race defined between the first raceway surface on the guide rail and the opposing raceway surface on the slider, end caps arranged on forward and aft ends of the carriage and made therein with turnaround passages to communicate the load carrying race with the return passage, and wherein the retainer harboring the roller therein is allowed to travel through a circulating circuit composed of the load-carrying race, return passage and paired turnaround passages, and wherein the embracing part fits into the circulating circuit in a way that the first lips travel along the outer side of the circulating circuit while the second lip runs along the inner side of the circulating circuit, and wherein there is left a clearance between the second lip and the rolling surface of the roller.

2. A linear motion guide unit with a retainer constructed as defined in claim 1, wherein the connecting flanges are each made of a plate member of a width not more than a third of a diameter of the roller.

3. A linear motion guide unit with a retainer constructed as defined in claim 1, wherein the embracing parts opposite diametrically of the retainer each have an outward surface that is made flat so that any two adjacent retainers are allowed to come into close contact with one another while moving one after another in successive array.

4. A linear motion guide unit with a retainer constructed as defined in claim 1, wherein the connecting flanges fit into guide grooves cut into a circulating circuit where the roller is allowed to roll through and be guided along the guide grooves as the roller runs through the circulating circuit.

5. A linear motion guide unit with a retainer constructed as defined in claim 1, wherein a measurement of a clearance left between diametrically opposing first lips is smaller than that of another clearance between the diametrically opposing second lips, and wherein the first lips move nearer the guide rail while the second lips move nearer the slider.

6. A linear motion guide unit with a retainer constructed as defined in claim 1, wherein the embracing part is made with a lubricant reservoir, which functions as a relief for easy withdrawal of the retainer out of a mold after a molding operation, on a side of the second lip in opposition to the first lip, and further made with another lubricant reservoir on a side of the first lip in opposition to the second lip.

7. A linear motion guide unit with a retainer constructed as defined in claim 1, wherein the connecting flanges fit into guide grooves cut into a circulating circuit where the roller is allowed to roll through, to be guided along the guide grooves as the roller runs through the circulating circuit, and wherein the connecting flanges are each made lopsided out of an axial center of the roller.

8. A linear motion guide unit with a retainer constructed as defined in claim 1, wherein a circular surface inside the second lip of the embracing part is made larger in a radius of curvature than that a circular surface inside the first lip of the embracing part.

9. A linear motion guide unit with a retainer constructed as defined in claim 1, wherein the retainer receives more than one roller for rotation therein and has the connecting flanges made rich in flexibility.

10. A linear motion guide unit with a retainer constructed as defined in claim 1, wherein the retainer receives more than one roller for rotation therein, and has the connecting flanges that are rich in flexibility and extend to span across the more than one roller in a shape curved to make an arched area.

11. A linear motion guide unit with a retainer constructed as defined in claim 1, wherein the embracing parts and the connecting flanges are both made integrally with synthetic resin, and wherein a pocket defined by the embracing parts together with the connecting flanges to fit over the roller is produced with a mold that is divided into parts.

12. A linear motion guide unit with a retainer; comprising an elongated guide rail having a first raceway surface extending lengthwise of the guide rail, and a slider having a second raceway surface in opposition to the first raceway surface, the slider being allowed to move relatively of the elongated guide rail by virtue of a roller, which rolls through a race defined between the first and second raceway surfaces;

wherein a retainer is provided to accommodate a roller therein;

wherein the retainer has embracing parts which engage a rolling surface of the roller at diametrically opposite sides thereof, and a pair of connecting flanges lying above axially opposite ends of the roller and connecting integrally the embracing parts with each other;

wherein each of the embracing parts are made with first lips raised above any one side of the associated embracing part to come into contact with the roller, and a second lip raised above another side of the associated embracing part to come into contact with the roller;

wherein the first and second lips are placed in a staggered relation with one another in an axial direction of the roller;

wherein the slider is comprised of a carriage made therein with a return passage extending lengthwise parallel with a load-carrying race defined between the first raceway surface on the guide rail and the opposing raceway surface on the slider, end caps arranged on forward and aft ends of the carriage and made therein with turnaround passages to communicate the load-carrying race with the return passage, and wherein the retainer harboring the roller therein is allowed to travel through a circulating circuit composed of the load-carrying race, return passage and paired turnaround passages, and wherein the return passage is provided by a hole rectangular in transverse section defined inside a tubular composition that fits into a bore made in the carriage, and the tubular skeleton having therein a lengthwise window made open from a circular surface thereof to the return passage, and a molded member extending lengthwise to fit into the window in the tubular skeleton to provide a return race for the return passage, the molded member being made of a cellular material adapted to be impregnated with lubricant.

13. A linear motion guide unit with a retainer constructed as defined in claim 12, wherein the tubular skeleton is made of synthetic resin while the cellular member is made of sintered resinous material.

14. A linear motion guide unit with a retainer; comprising an elongated guide rail having a first raceway surface extending lengthwise of the guide rail, and a slider having a second raceway surface in opposition to the first raceway surface, the slider being allowed to move relatively of the elongated guide rail by virtue of a roller, which rolls through a race defined between the first and second raceway surfaces;

wherein a retainer is provided to accommodate a roller therein;

wherein the retainer has embracing parts which engage a rolling surface of the roller at diametrically opposite sides thereof, and a pair of connecting flanges lying above axially opposite ends of the roller and connecting integrally the embracing parts with each other;

wherein each of the embracing parts are made with first lips raised above any one side of the associated embracing part to come into contact with the roller, and a second lip raised above another side of the associated embracing part to come into contact with the roller;

wherein the first and second lips are placed in a staggered relation with one another in an axial direction of the roller;

wherein the slider is comprised of a carriage made therein with a return passage extending lengthwise parallel with a load-carrying race defined between the first raceway surface on the guide rail and their opposing raceway surface on the slider, end caps arranged on forward and aft ends of the carriage and made therein with turnaround passages to communicate the load-carrying race with the return passage, and wherein the retainer harboring the roller therein is allowed to travel through a circulating circuit composed of the load-carrying race, return passage and paired turnaround passages, wherein the retainer in the load-carrying race is carried for movement at the connecting flanges thereof by retainer plates secured to the slider, wherein the retainer plates secured to the slider are composed of an upside retainer plate, a middle retainer plate and a downside retainer plate, and wherein the retainer plates fit into any one of recess and setback, which are cut into the carriage simultaneously with cutting of the race into the carriage of the slider.

* * * * *